May 7, 1929.   W. B. ROBE   1,712,050
AUTOMOBILE SPRING CONSTRUCTION
Filed Nov. 30, 1923    2 Sheets-Sheet 1
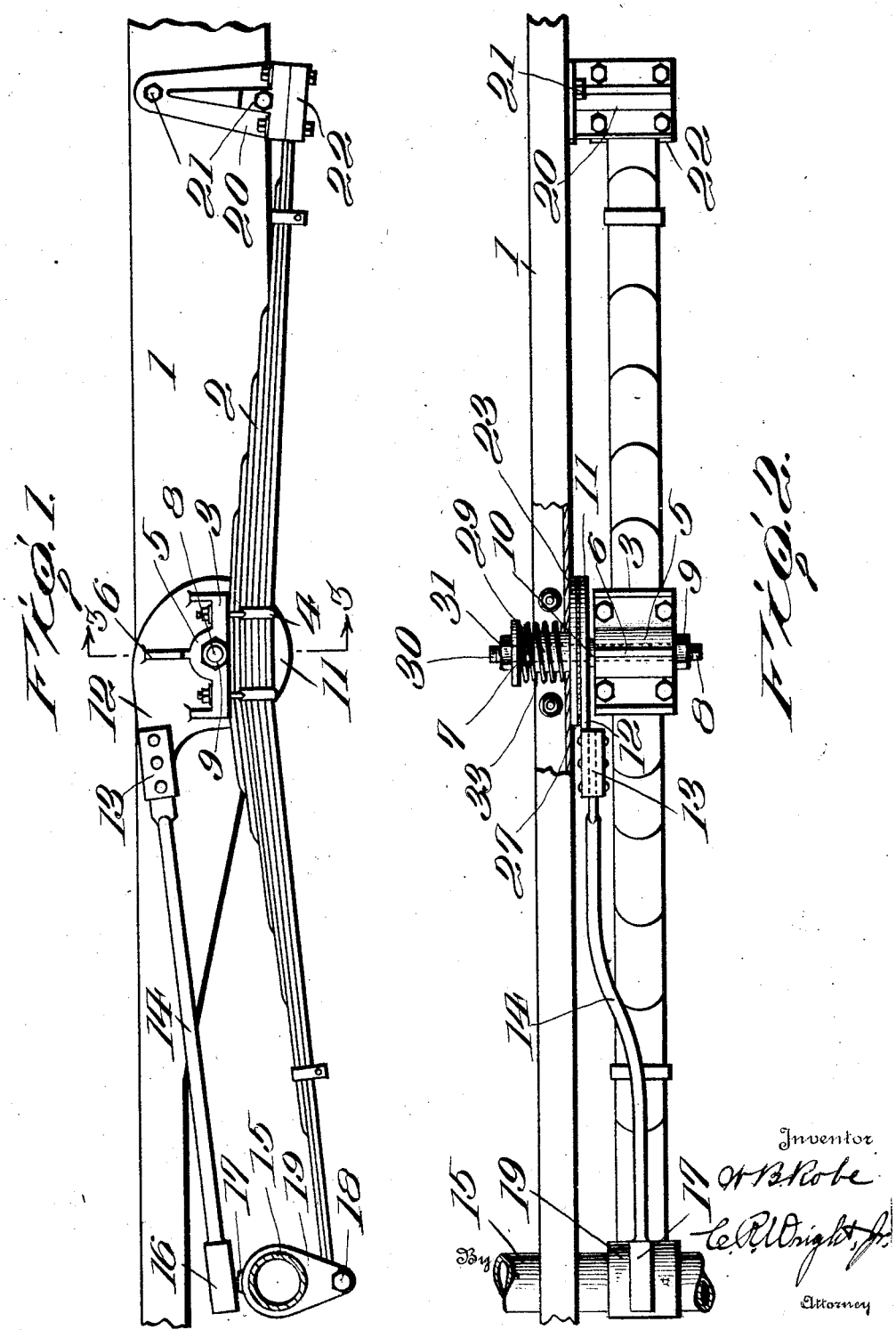
Inventor
W. B. Robe
By C. R. Wright Jr.
Attorney

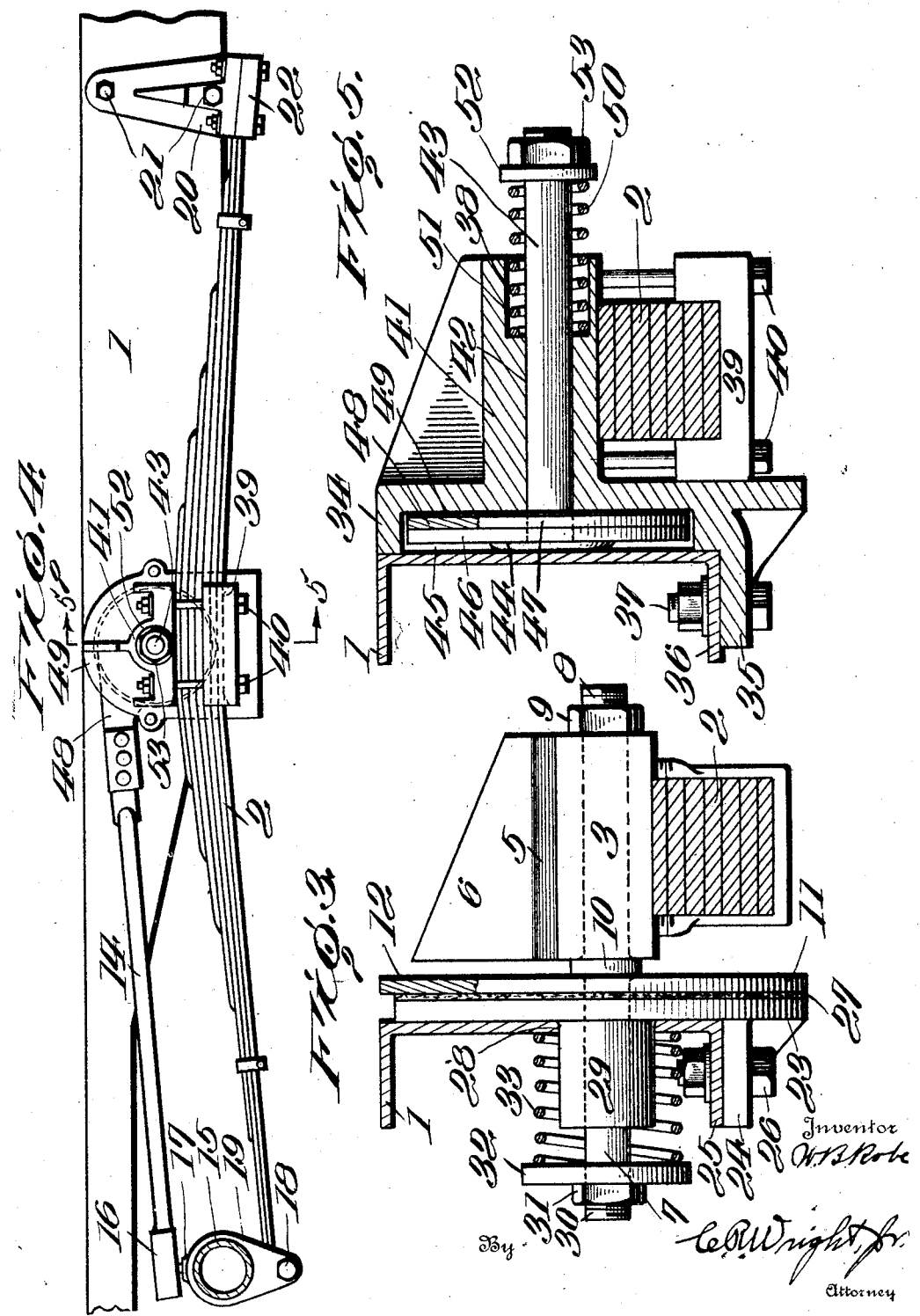

Patented May 7, 1929.

1,712,050

UNITED STATES PATENT OFFICE.

WALTEN B. ROBE, OF NORFOLK, VIRGINIA.

AUTOMOBILE SPRING CONSTRUCTION.

Application filed November 30, 1923. Serial No. 677,703.

My invention relates to improvements in automombile spring construction.

The object of my invention is to provide a spring construction having combined, therewith an equalizer or shock absorber connected to the axle and adapted to slow up the action of the spring and prevent a hammer blow on any part of the driving or other mechanism of the automobile, and at the same time gives an equalizing effect so that all the springs receive approximately the same amount of shock regardless of the position of the load in the automobile.

Another object of my invention is to provide a spring construction for automobiles in which, all four springs are of the same size and design, and each spring forming a unit in itself which does not depend on any of the torque or radius rods, and prevents distortion in the general construction of the automobile.

A further object of my invention is to provide a spring construction which will not distort the frame and allow the construction of an automobile with a perfectly rigid frame and at the same time provide a much smoother riding automobile in which the shocks of the road are not imparted to the body.

A still further object of my invention is to provide a spring construction which can be applied to the ordinary automobile and in which any of the parts can be repaired or replaced with ease and at the same time to provide a cheap, simple and effective structure having certain details of structure and combination of parts hereinafter more fully described.

In the accompanying drawings:—

Figure 1 is the side elevation showing my improved spring construction applied to the chassis of the automobile.

Fig. 2 is a top plan view of Figure 1.

Figure 3 is a transverse sectional view taken on the line 3—3 looking in the direction of the arrow of Figure 1.

Figure 4 is a side elevation of a modified form of means for attaching the spring to the chassis of the automobile.

Figure 5 is a vertical sectional view taken on the line 5—5 Figure 4.

Referring now to the drawings 1 represents the U-beam of the chassis of an automobile and to which the spring 2 is attached as will be hereinafter more fully described. The springs 2 are constructed exactly alike for both the front and rear axles and in my drawings I will described a single spring.

The spring 2 as shown in Figure 1 of the drawings has connected at its center the plate 3, by means of the clip 4, and said plate is provided with an elongated hub portion 5. The hub portion 5 is provided with a horizontally arranged opening 6 through which passes the bolt 7 carried by the chassis of the automobile and which will be hereinafter more fully described. The bolt 7 at its outer end is screw threaded as indicated at 8 and upon which is screwed the nut 9 by means of which the spring is held on the bolt. This construction makes a very simple means of attaching the spring to the chassis and also allows the ready removal of the spring therefrom.

The bolt 7 on the inside of the spring is provided with a circular shoulder 10 and rotatably mounted upon the bolt on the inner side of the shoulder 10 is a disk 11 having an outwardly extending arm 12 to which is connected at 13, the torsion rod 14. The torsion rod 14 extends out over the axle 15 and is provided with a socket 16 adapted to receive a ball carried by the stud 17 carried by the axle and forming a universal connection with the axle.

While I have shown this specific form of attaching the torsion rod 14 to the axle, it will be understood that any form of universal connections could be employed, without departing from my invention.

The spring 2 has one end pivotally connected at 18 to the bracket 19 rigidly connected to the axle 15 and said bracket also carrying the stud 17, as clearly shown in Figure 1 of the drawing. The opposite end of the spring is preferably attached to a bracket 20 bolted to the frame of the automobile by means of the bolt 21 and the spring having a sliding connection for this end of the spring, but it will be understood that the spring can be attached in any desired manner.

Surrounding the bolt 7 on the inside of the disk 11 is a disk 23 which is provided at its lower end with a laterally extending flange 24 which bears against the horizontal flange 25 formed integral with the U-beam 1 and secured thereto by means of bolts 26. The outer face of the disk 23 is provided with a friction disk 27 which is also engaged by the disk 11 as clearly shown, in Figure 3 of the drawing.

The U-beam 1 is provided with an enlarged opening 28 through which a hub 29 passes, said hub being formed rigid with the disk 23. This hub portion 29 is provided with a central opening through which the bolt 7 passes. The inner end of the bolt 7 is screw threaded as indicated at 30 and upon which is screwed a nut 31. Carried by the bolt 7 on the inside of the nut 31 is a washer 32 which engages a coil spring 33 surrounding the hub 29 and bearing against the inner face of U-beam 1.

By this structure it will be seen that the tension of the spring 33, through the medium of the washer 32 forces the bolt 5 to the left as shown in Figure 1 causing the annular flange 10 to engage the disk 11 and cause it to frictionally engage the friction surface 27 carried by the disk 23 and whereby the rotation of the disk 11 is retarded. By adjusting the nut 31 the tension of the spring 33 is increased or decreased so as to increase or decrease the friction between the disks 11 and 23.

From the foregoing description it will be seen that any shocks imparted to the axle 15 of the automobile causes the spring 2 to straighten out to a more or less degree as the axle will move upwardly in a vertical direction, therefore moving the torsion rod 14 and said torsion rod being rigidly connected to the arm 12 carried the disk 11, the disk 11 is rocked on the bolt 7 and the movement thereof controlled by the frictional contact with the disk 23. This retards the movement of the axle so that the short hammer blows of the axle are not imparted to the body of the automobile.

In the modification shown in Figures 4 and 5 instead of having the spring pivotally mounted on the chassis I provide a housing 34 which is provided at its lower end with a flange 35 bolted to the flange 36 of the U-beam 1 which by means of bolts 37, the outside of the housing 34 is provided with a horizontally arranged plate 38 to which the spring 2 is clamped by means of the plate 39 and the bolts 40 as clearly shown in Figure 5 of the drawing. While I have shown this form of attaching the spring, U-shaped clips may be employed, as the manner of attaching the spring forms no part of the invention.

The horizontal flange 38 is provided with a hub portion 41 provided with an opening 42 and through which passes a bolt 43, having the head 44 on its inner end arranged in the space 45 of the housing 34, and surrounding the bolt 43 adjacent the head 44 is a disk 46 bearing against the disk 47, which is provided with an outwardly extending arm 48 extending through the opening 45 in the housing 34 and connected to said torsion rod 14 arranged and constructed in the same manner as that shown in Figures 1 and 2 of the drawing. The inner face of the space 45 is provided with a friction disk 49 which engages the disk 47 and retards the movement thereof. In order to cause a frictional contact of the disk 47 on the friction disk 49, I provide a coil spring 50 surrounding the bolt 43 and having its inner end resting in an annular recess in the hub 38 and its outer end bearing against a washer 52 held on the bolt by the nut 53. By adjusting the nut 53 on the bolt it will be seen that the tension of the spring is varied and the frictional contact between the disk 47 and the friction face 49 is varied and the movement of the torsion rod 14 retarded. This operation is precisely the same as that described in respect to Figures 1, 2 and 3.

I claim:

1. The combination with a chassis of a spring attached to the chassis and having one end connected to the axle, and an equalizer mounted on the spring attaching means and having a rigid arm connected to the axle and having its friction surface only engaging means rigidly connected to the chassis.

2. The combination with a chassis, of a spring mounted intermediate its ends thereto and having one end connected with the chassis and connected at the opposite end to the axle and an equalizer carried by the chassis at the point of connection with the spring, and having a rigid arm connected to the axle and having its friction surface only engaging means rigidly connected to the chassis.

3. The combination of a chassis, of a spring mounted intermediate its ends on the chassis, and having one end connected thereto, and the opposite end connected to the axle, and an equalizer connected to the chassis concentric with the central connection of the spring, and a rigid arm connecting the equalizer and the axle and having its friction surface only engaging means rigidly connected to the chassis.

4. The combination with a chassis, of a spring attached intermediate its ends to the chassis and having one end connected with the chassis and its opposite end connected with the axle, and an equalizer mounted upon the spring attaching means and having a rigid arm connected to the axle and having its friction surface only engaging means rigidly connected to the chassis.

5. The combination with a chassis of a spring attached intermediate its ends to the chassis and having one end connected to the chassis and the opposite end connected to the axle, and a pivoted equalizer mounted on the spring attaching means and having a rigid arm connected to the axle and having its friction surface only engaging means rigidly connected to the chassis.

6. The combination with a chassis, of a spring attached intermediate its ends to the chassis and having one end connected to the chassis and the opposite end connected to the axle, and a equalizer composing friction disks pivotally mounted on the spring attaching means and a rigid arm connected to one of said disks and to the axle and having its friction surface only engaging means rigidly connected to the chassis.

7. The combination with a chassis, of a spring pivotally mounted intermediate its ends thereto and having one end connected with the chassis and pivotally connected at the opposite end to the axle, and an equalizer mounted upon the pivot of the spring and having a rigid arm connected to the axle and having its friction surface only engaging means rigidly connected to the chassis.

8. The combination with a chassis, of a spring pivotally mounted intermediate its ends thereto and having one end connected with the chassis and pivotally connected at the opposite end to the axle, and an equalizer mounted upon the pivot of the spring and having a rigid arm having a ball and socket connection with the axle and having its friction surface only engaging means rigidly connected to the chassis.

9. The combination with a chassis, of a spring pivotally mounted intermediate its ends thereto and having one end connected with the chassis and pivotally connected at the opposite end to the lower face of the axle, and an equalizer mounted upon the pivot of the spring and having a rigid arm having a ball and socket connection with the upper face of the axle and having its friction surface only engaging means rigidly connected to the chassis.

10. The combination with a chassis, of a spring pivotally mounted intermediate its ends thereto and having one end connected with the chassis and pivotally connected at the opposite end to one face of the axle, and an equalizer pivotally mounted upon the pivot of the spring and having friction means and having a rigid arm having a ball and socket connection with the other face of the axle and having its friction surface only engaging means rigidly connected to the chassis.

11. The combination with a chassis, of a semi-elliptical spring pivotally mounted intermediate its ends thereto and having one end connected with the chassis and pivotally connected at the opposite end to the axle, and an equalizer mounted upon the pivot of the spring and having a rigid arm connected to the axle and having its friction surface only engaging means rigidly connected to the chassis.

12. The combination with a chassis, of a semi-elliptical spring pivotally mounted intermediate its ends thereto and having one end connected with the chassis and pivotally connected at the opposite end to the axle, and an equalizer mounted upon the pivot of the spring and having a rigid arm having a ball socket connection with the axle and having its friction surface only engaging means rigidly connected to the chassis.

13. The combination with a chassis, of a semi-elliptical spring pivotally mounted intermediate its ends thereto and having one end connected with the chassis and pivotally connected at the opposite end to one face of the axle, and an equalizer mounted upon the pivot of the spring and having a rigid arm having a ball and socket connection with the opposite face of the axle and having its friction surface only engaging means rigidly connected to the chassis.

14. The combination with a chassis, of a spring pivotally mounted intermediate its ends thereto and having one end connected with the chassis and pivotally connected at the opposite end to one face of the axle, and an equalizer mounted upon the pivot of the spring and having a rigid arm connected to the opposite face of the axle and having its friction surface only engaging means rigidly connected to the chassis.

15. The combination with a chassis, of a spring pivotally mounted intermediate its ends thereto and having one end connected with the chassis and pivotally connected at the opposite end to one face of the axle, and an equalizer pivotally mounted upon the pivot of the spring and having friction means for engaging the chassis and having a rigid arm connection with the opposite face of the axle and having its friction surface only engaging means rigidly connected to the chassis.

16. The combination with a chassis, of a spring pivotally mounted intermediate its ends to the chassis and having one end connected with the chassis and pivotally connected at the opposite end to one face of the axle, and an equalizer pivotally mounted upon the pivot of the spring and having friction means for engaging the chassis and having a rigid arm having a movable connection with the opposite face of the axle and having its friction surface only engaging means rigidly connected to the chassis.

In testimony whereof, I have signed this specification.

WALTEN B. ROBE.